April 7, 1964  W. H. BUHRMANN  3,127,780
BELT DRIVE
Filed May 18, 1962

INVENTOR.
WAYNE H. BUHRMANN
BY
J. B. Holden
ATTORNEY

United States Patent Office 3,127,780
Patented Apr. 7, 1964

3,127,780
BELT DRIVE
Wayne H. Buhrmann, Martell, Nebr., assignor to The Goodyear Tire & Rubber Company, Akron, Ohio, a corporation of Ohio
Filed May 18, 1962, Ser. No. 195,754
2 Claims. (Cl. 74—229)

This invention relates to a power transmission drive and more particularly to a V-belt drive for use on automotive vehicles.

For the past several years, there has been an expanding use of vehicles, such as truck or tractor, having a pair of dual wheel tandem axles, many having only one axle driven by the power plant of the vehicle. The other axle in such instances, serves primarily as a load distributing member and is idle, that is, does not supply any driving force to the vehicle. To directly drive each axle by the vehicle power plant requires a complicated and expensive mechanism so that a V-belt drive has been used in which a large diameter V-belt sheave is mounted between each pair of dual wheels and a V-belt trained around the sheaves on each side of the vehicle. The V-belt then furnishes power to the normally idle or rolling axle from the driven axle to materially increase the driving and braking power of the vehicle thus increasing the ability of the vehicle to pull loads under adverse weather conditions and over mountainous and other severe road conditions.

The belt and pulley combinations previously used for such drives have been of angle in the neighborhood of 40° which are the commonly used combination. In a power drive of the described type with this construction, a high tension on the belt is required to provide adequate driving force. If the tension is not maintained, then slipping is encountered and results in rapid belt wear and poor torque transmission.

In order to maintain the proper tension on the belt, frequent adjustments are necessary and such adjustments are very difficult to make due to the nature of the structure. It has been found that by materially reducing the belt and pulley angles, considerably less tension is required to maintain adequate torque transmission so that the belt service life is materially increased. Adjustment of the drive after the initial installation is in most instances, eliminated completely thus effecting a major saving in the down time and labor required by such adjustments. It has been found also that the use of a belt of substantial thickness increases the torque transmitted by the belt. It is, therefore, an object of this invention to provide a new and novel power transmission drive for an automotive vehicle.

Another object of the invention is to provide a power transmission belt drive that operates under relatively low belt tensions.

A further object of the invention is to provide a belt transmission that increases the belt life and requires little, if any, adjustment after installation in order to maintain its effectiveness.

These and other objects and advantages of this invention will become apparent hereinafter as the description thereof proceeds, the novel features, arrangements and combinations being clearly pointed out in the specification as well as in the claims thereunto appended.

Figure 1:
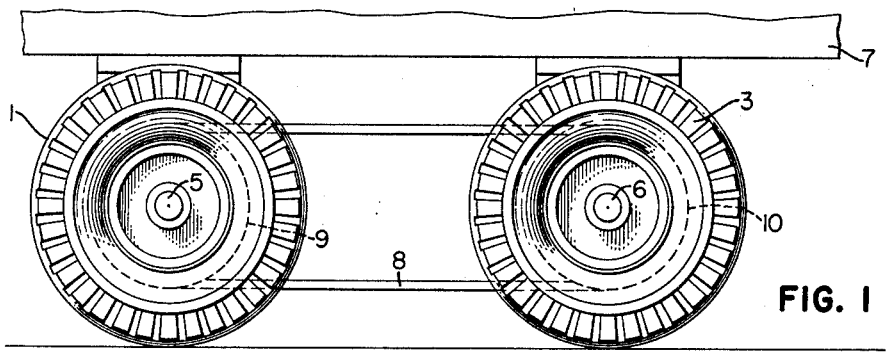
FIG. 1 is a side elevation of a tandem truck wheel installation utilizing the drive of the present invention.
Figure 2:
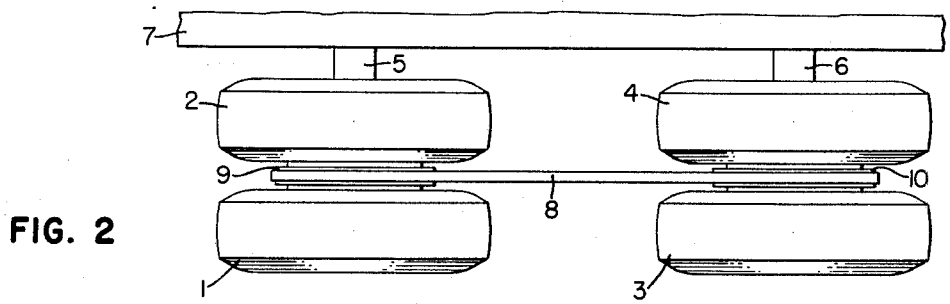
FIG. 2 is a plan view of the invention of FIG. 1.

In FIGS. 1 and 2, a typical tandem wheeled truck, tractor or the like is shown wherein a pair of wheels 1 and 2 and a pair of wheels 3 and 4 are mounted on conventional axles 5 and 6 respectively attached in the usual manner to the truck frame 7. The pairs of wheels 1, 2 and 3, 4 are in tandem and it being understood that similar pairs of wheels are mounted on the opposite side of the vehicle. For the purposes of description, axle 5 carrying inner wheel 1 and outer wheel 2 with a similar pair of the opposite side of the vehicle is driven by the power plant of the vehicle through the usual drive shaft although, if desired, axle 6 may be the one driven by the power plant of the vehicle. Axle 6 as shown is an idle or undriven axle which may be either a through or stub axle. In order to apply a driving force to wheels 3 and 4 on axle 6, a V-belt 8 engages pulleys 9 and 10 mounted between wheels 1 and 2 and wheels 3 and 4 respectively, belt 8 thus driving wheels 3 and 4 as wheels 1 and 2 are driven by the vehicle power plant.

Figure 3:
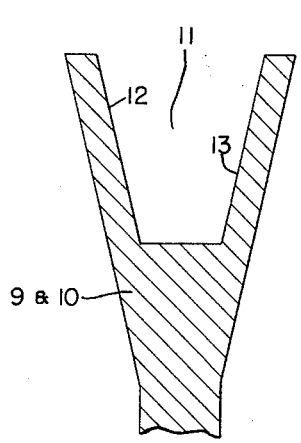
FIG. 3 is a partial radial section of a typical pulley used with the invention.

In accordance with the invention, the belt groove 11 in the pulley or sheave circumference to receive belt 8 has angularly inclined sides 12 and 13. Sides 12 and 13 form an included angle therebetween in the range of 22° to 32° as seen in FIG. 3 and in the preferred form, the angle is 26° with the depth of the groove being greater than the thickness of the V-belt to prevent bottoming of the V-belt in the groove.

Figure 4:
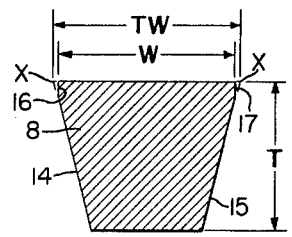
FIG. 4 is a cross-section of a typical belt used with the invention.

In FIG. 4, a typical belt cross-section is shown with angularly extending sides 14 and 15 forming an included angle in the range of 22° to 32°. The belt angle for proper operation must be at least as large as that of the pulley groove which it engages. Preferably the belt angle should be slightly greater and with a 26° pulley groove angle, a 28° belt operates extremely well. Since the pulley diameters for this particular drive are in the range of 24", satisfactory operation is obtained with a belt having the same angle as the pulley since there is no substantial change caused by the belt wrap around in the pulley.

Figure 5:
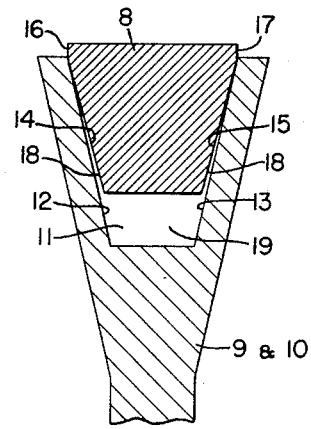
FIG. 5 is a cross-section showing the belt in the operating position on the pulley.

FIG. 5 illustrates the belt 8 in groove 11 of the pulley where the belt angle is 28° and the pulley angle 26°. As a result of the slight differential in the angles, a slight clearance 18 (exaggerated) between the belt and pulley sides is formed as is well known by those skilled in the art. The usual clearance 19 between the bottom of belt 8 and pulley 9 is provided.

Because of the high torque loads that must be transmitted by the V-belts in the drive of this invention, the belt thickness T should be at least 75% of theoretical top width TW of the belt. The theoretical top width is the distance between the points of the intersections of the extension of the sides with the extension of the top surface as at X. The actual width W of the belt is the maximum actual width of the belt as defined by the distance between the vertical edges 16 and 17. Belt thickness directly affects the stiffness of a belt and a stiff belt under an identical tension will transmit considerably more torque than a flexible or limber belt. As a result, it has been determined that by the use of a belt having a thickness of at least 75% of the theoretical top width under identical tensions, greater torque is transmitted by such a belt than that transmitted by a more flexible belt (less thickness but of same angle and top width). A belt section that has been found to perform extremely well has a theoretical top width of 1.375" and a thickness of 1.125" or a ratio of thickness to theoretical width of substantially 84%.

In the belt transmission drive of this invention, the stiffness of the belt and the lower angle of the belt and pulley groove complement each other to provide a belt transmission combination that results in long belt life with little or no subsequent tension adjustment. Since considerably less tension is required by this belt transmission, its effectiveness is substantially maintained even though the initial tension is somewhat reduced through normal wear.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A belt drive for use in combination with an automotive vehicle having dual axles, one driven and one idle, with aligned dual tire rims on each end of each axle, comprising a V-belt sheave mounted between each of the dual rims and aligned with the other sheave, the belt receiving groove around the outer periphery of each sheave having angularly extending sides, the included angle of said belt receiving groove in each sheave being in the range of 22° to 32° and a V-belt under tension in said grooves of the aligned sheaves to drive the idle axle from the driven axle when power is applied thereto, the included angle of said belt being in the range of 22° to 32°, the angle being no less than that of said belt receiving groove in said sheave around which it is trained and the thickness of the belt being at least 75% of the theoretical top width of the belt.

2. The combination as claimed in claim 1 in which the pulley groove angle is 26°, the belt angle 28° and the belt thickness is in the range of 80 to 84% of the theoretical top width of the belt.

References Cited in the file of this patent
UNITED STATES PATENTS 2,733,612     Sterkel _____ Feb. 7, 1956

FOREIGN PATENTS 60,798     Norway _____ May 1, 1939